US012640077B2

(12) United States Patent
Liu et al.

(10) Patent No.: US 12,640,077 B2

(45) Date of Patent: May 26, 2026

(54) DISPLAY DEVICE WITH DISPLAY BLOCKS HAVING DIFFERENT FRAME FREQUENCIES

(71) Applicant: WUHAN CHINA STAR OPTOELECTRONICS TECHNOLOGY CO., LTD., Wuhan (CN)

(72) Inventors: Xialing Liu, Wuhan (CN); Zhou Zhang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/870,633

(22) PCT Filed: Jun. 30, 2023

(86) PCT No.: PCT/CN2023/104837

§ 371 (c)(1),
(2) Date: Nov. 29, 2024

(87) PCT Pub. No.: WO2024/159703

PCT Pub. Date: Aug. 8, 2024

(65) Prior Publication Data

US 2025/0329283 A1 Oct. 23, 2025

(30) Foreign Application Priority Data

Jan. 31, 2023 (CN) ......................... 202310099024.6

(51) Int. Cl.
*G09G 3/20* (2006.01)

(52) U.S. Cl.
CPC ..... *G09G 3/2085* (2013.01); *G09G 2310/027* (2013.01); *G09G 2310/0286* (2013.01);
(Continued)

(58) Field of Classification Search
CPC .................................................... G09G 3/2085
See application file for complete search history.

(56) References Cited

U.S. PATENT DOCUMENTS

| | | | | |
|---|---|---|---|---|
| 11,410,594 | B1 * | 8/2022 | Chen | G09G 3/2007 |
| 2011/0032231 | A1 | 2/2011 | Maruyama et al. | |

(Continued)

FOREIGN PATENT DOCUMENTS

| | | | |
|---|---|---|---|
| CN | 1909043 | A | 2/2007 |
| CN | 110197623 | A | 9/2019 |

(Continued)

OTHER PUBLICATIONS

Chinese Office Action issued in corresponding Chinese Patent Application No. 202310099024.6 dated Jul. 16, 2025, pp. 1-7.

(Continued)

*Primary Examiner* — Gustavo Polo

(74) *Attorney, Agent, or Firm* — PV IP PC; Peter Stecher; Wei Te Chung

(57) ABSTRACT

The present application discloses a display device. The display device comprises a display panel, a plurality of driving modules, and a control module. The display panel comprises a plurality of display blocks; the plurality of driving modules and the plurality of display blocks are arranged in a one-to-one correspondence manner, and each driving module is provided in a corresponding display block; the control module is separately connected to the plurality of driving modules, and the driving modules are controlled by the control module to drive the display blocks to display; and the frame frequencies of at least two display blocks are different.

16 Claims, 5 Drawing Sheets

(52) U.S. Cl.
CPC . *G09G 2310/0291* (2013.01); *G09G 2310/04* (2013.01); *G09G 2330/021* (2013.01); *G09G 2340/0435* (2013.01); *G09G 2350/00* (2013.01); *G09G 2360/12* (2013.01)

(56) References Cited

U.S. PATENT DOCUMENTS

| | | | | |
|---|---|---|---|---|
| 2012/0092320 | A1* | 4/2012 | Li | G09G 5/008 345/87 |
| 2022/0139344 | A1* | 5/2022 | Shao | G09G 3/005 345/204 |
| 2022/0309977 | A1 | 9/2022 | Lu | |

FOREIGN PATENT DOCUMENTS

| | | | |
|---|---|---|---|
| CN | 111756367 | A | 10/2020 |
| CN | 112213867 | A | 1/2021 |
| CN | 115240594 | A | 10/2022 |
| CN | 115938300 | A | 4/2023 |
| CN | 116665592 | A | 8/2023 |

OTHER PUBLICATIONS

International Search Report in International application No. PCT/CN2023/104837, mailed on Oct. 16, 2023.
Written Opinion of the International Search Authority in International application No. PCT/CN2023/104837, mailed on Oct. 16, 2023.

* cited by examiner

DISPLAY DEVICE WITH DISPLAY BLOCKS HAVING DIFFERENT FRAME FREQUENCIES

CROSS-REFERENCE TO RELATED APPLICATION

This application is US national phase application based upon an International Application No. PCT/CN2023/104837, filed on Jun. 30, 2023, which claims priority to and the benefit of Chinese Patent Application No. 202310099024.6, filed on Jan. 31, 2023. The disclosures of the aforementioned applications are incorporated herein by reference in their entireties.

TECHNICAL FIELD

The present disclosure relates to the field of display technologies, and more particularly to a display device.

BACKGROUND

With continuous development of the display technologies, users propose higher demands for multi-scene applications of a display device. For example, the users desires that the same display device can display different pictures at the same time to meet the requirements of different application scenes. However, the current display device has high power consumption when it meets the requirements of different application scenes.

SUMMARY

The present disclosure provides a display device to solve technical problems of high power consumption of the display device in the related art when meeting the requirements of different application scenes.

The present disclosure provides a display device, including:

- a display panel including a plurality of display blocks;
- a plurality of driving modules disposed in one-to-one correspondence with the plurality of display blocks, wherein each of the driving modules is disposed in corresponding one of the display blocks; and
- a control module connected to the plurality of driving modules, respectively, where each of the driving modules is configured to drive the corresponding display block to display under control of the control module;
- where frame frequencies of at least two of the display blocks are different from each other, and each of the driving modules includes a shift register, a latch, a level converter, a decoder, a digital-to-analog converter, and an operational amplifier connected sequentially;
- each of the display blocks includes a display region and one frame region connected to the display region, and the driving module corresponding to the each display block is disposed in the display region and/or the frame region of the each display block; and
- the display panel further includes a plurality of display portions, where each of the display portions includes a plurality of display blocks, frame frequencies of the plurality of display blocks located in the same display portion are the same as each other, and frame frequencies of the plurality of display portions are different from each other.

Optionally, in some embodiments of the present disclosure, the latch is configured to latch image data corresponding to one frame of display picture.

Optionally, in some embodiments of the present disclosure, the each of the display blocks includes a plurality of sub-pixels arranged in m rows and n columns, and the latch includes m sequentially connected sub-latches each for storing image data corresponding to corresponding row of sub-pixels of the m rows of sub-pixels, where M is an integer greater than or equal to 2, and n is an integer greater than or equal to 1.

Optionally, in some embodiments of the present disclosure, at least one of the sub-latches is disposed in a space between adjacent rows of the sub-pixels of the m rows of sub-pixels.

Optionally, in some embodiments of the present disclosure, the latch includes a plurality of flip-flops arranged in m rows and n columns, where each of the flip-flops includes a trigger terminal, an input terminal, and an output terminal; N flip-flops located in the same row constitute one of the sub-latches;

- trigger terminals of the flip-flops located in the same row are connected with the same trigger signal; in the same column of flip-flops, an input terminal of the first row of flip-flop is connected to the shift register, an output terminal of the k-th row of flip-flop is connected to an input terminal of the (k+1)-th row of flip-flop, and an output terminal of the n-th row of flip-flop is connected to the level converter; where k is an integer greater than or equal to 1 and less than or equal to (m−1).

Optionally, in some embodiments of the present disclosure, the driving module includes m stages of shift registers connected in one-to-one correspondence with input terminals of m flip-flops located in the first row and m groups of level converters connected in one-to-one correspondence with output terminals of n flip-flops located in the m-th row.

Optionally, in some embodiments of the present disclosure, the frame frequency of the display block is less than or equal to 1 Hz.

Optionally, in some embodiments of the present disclosure, the latch is configured to latch one row of display data in the frame of display picture.

Optionally, in some embodiments of the present disclosure, the control module is configured to output a clock signal, image data, and a trigger signal to the driving modules, and adjust frame frequencies of the display blocks by controlling pulse frequencies of the clock signal, the image data, and the trigger signal.

The present disclosure further provides a display device, including:

- a display panel including a plurality of display blocks;
- a plurality of driving modules disposed in one-to-one correspondence with the plurality of display blocks, wherein each of the driving modules is disposed in corresponding one of the display blocks; and
- a control module connected to the plurality of driving modules, respectively, where each of the driving modules is configured to drive the corresponding display block to display under control of the control module;
- where frame frequencies of at least two of the display blocks are different from each other.

Optionally, in some embodiments of the present disclosure, each of the driving modules includes a shift register, a latch, a level converter, a decoder, a digital-to-analog converter, and an operational amplifier connected sequentially; and each of the display blocks includes a display region and one frame region connected to the display region, and the driving module corresponding to the each display block is disposed in the display region and/or the frame region of the each display block.

Optionally, in some embodiments of the present disclosure, the latch is configured to latch image data corresponding to one frame of display picture.

Optionally, in some embodiments of the present disclosure, the each of the display blocks includes a plurality of sub-pixels arranged in m rows and n columns, and the latch includes m sequentially connected sub-latches each for storing image data corresponding to corresponding row of sub-pixels of the m rows of sub-pixel, where M is an integer greater than or equal to 2, and n is an integer greater than or equal to 1.

Optionally, in some embodiments of the present disclosure, at least one of the sub-latches is disposed in a space between adjacent rows of the sub-pixels of the m rows of sub-pixels.

Optionally, in some embodiments of the present disclosure, the latch includes a plurality of flip-flops arranged in m rows and n columns, where each of the flip-flops includes a trigger terminal, an input terminal, and an output terminal; N flip-flops located in the same row constitute one of the sub-latches;

trigger terminals of the flip-flops located in the same row are connected with the same trigger signal; in the same column of flip-flops, an input terminal of the first row of flip-flop is connected to the shift register, an output terminal of the k-th row of flip-flop is connected to an input terminal of the (k+1)-th row of flip-flop, and an output terminal of the n-th row of flip-flop is connected to the level converter; where k is an integer greater than or equal to 1 and less than or equal to (m−1).

Optionally, in some embodiments of the present disclosure, the driving module includes m stages of shift registers connected in one-to-one correspondence with input terminals of m flip-flops located in the first row and m groups of level converters connected in one-to-one correspondence with output terminals of n flip-flops located in the m-th row.

Optionally, in some embodiments of the present disclosure, the frame frequency of the display block is less than or equal to 1 Hz.

Optionally, in some embodiments of the present disclosure, the latch is configured to latch one row of display data in the frame of display picture.

Optionally, in some embodiments of the present disclosure, the control module is configured to output a clock signal, image data, and a trigger signal to the driving modules, and adjust frame frequencies of the display blocks by controlling pulse frequencies of the clock signal, the image data, and the trigger signal.

Optionally, in some embodiments of the present disclosure, the display panel further includes a plurality of display portions, where each of the display portions includes a plurality of display blocks, frame frequencies of the plurality of display blocks located in the same display portion are the same as each other, and frame frequencies of the plurality of display portions are different from each other.

Beneficial Effects

The present disclosure provides a display device, including: a display panel, a plurality of driving modules, and a control module. The display panel includes a plurality of display blocks; the plurality of driving modules are disposed in one-to-one correspondence with the plurality of display blocks, where each of the driving modules is disposed in corresponding one of the display blocks; and the control module is connected to the plurality of driving modules, respectively, where each of the driving modules is configured to drive the corresponding display block to display under control of the control module; where frame frequencies of at least two of the display blocks are different from each other. The present disclosure can independently adjust and control the frame frequencies of the plurality of display blocks with the plurality of driving modules, so that the display device can perform display in frame frequencies of display partitions, thereby meeting the requirements of different application scenes and reducing the power consumption of the display device.

DETAILED DESCRIPTION

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

Additionally, the terms "first" and "second" specification and claims in the present disclosure are used to distinguish different objects, and are not used to describe a specific order. The terms "include" and "have" and any variations thereto are intended to cover non-exclusive inclusions.

The present disclosure provides a display device, which is described in detail below. It should be noted that the description order of the following embodiments of the present disclosure is not intended to limit the preferred order of the embodiments.

Figure 1:
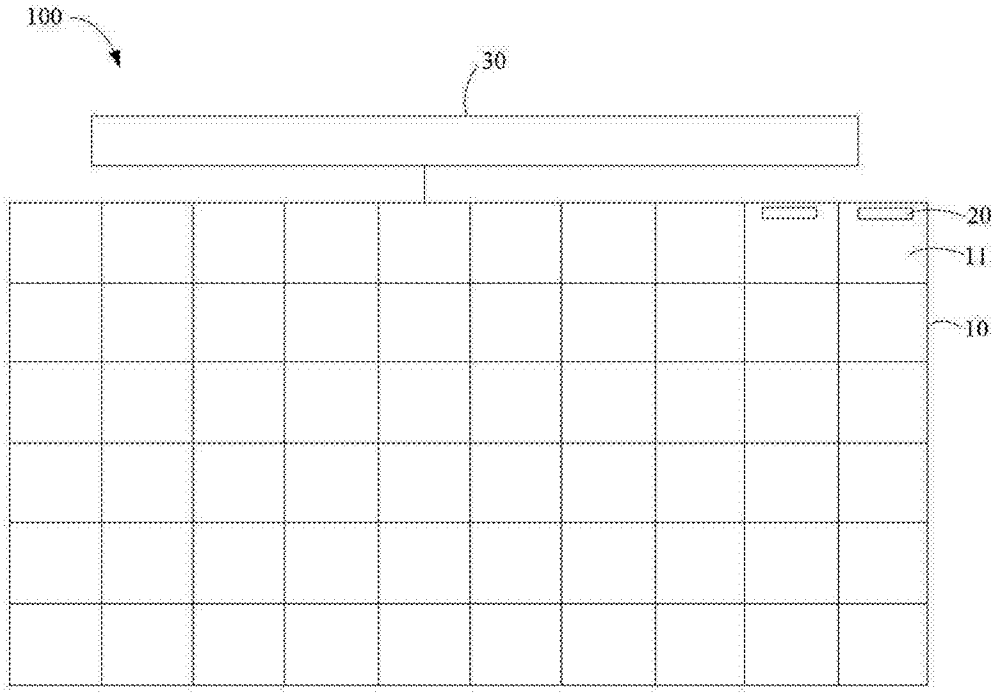
FIG. 1 is a schematic structural diagram of a display device according to the present disclosure.
Figure 2:
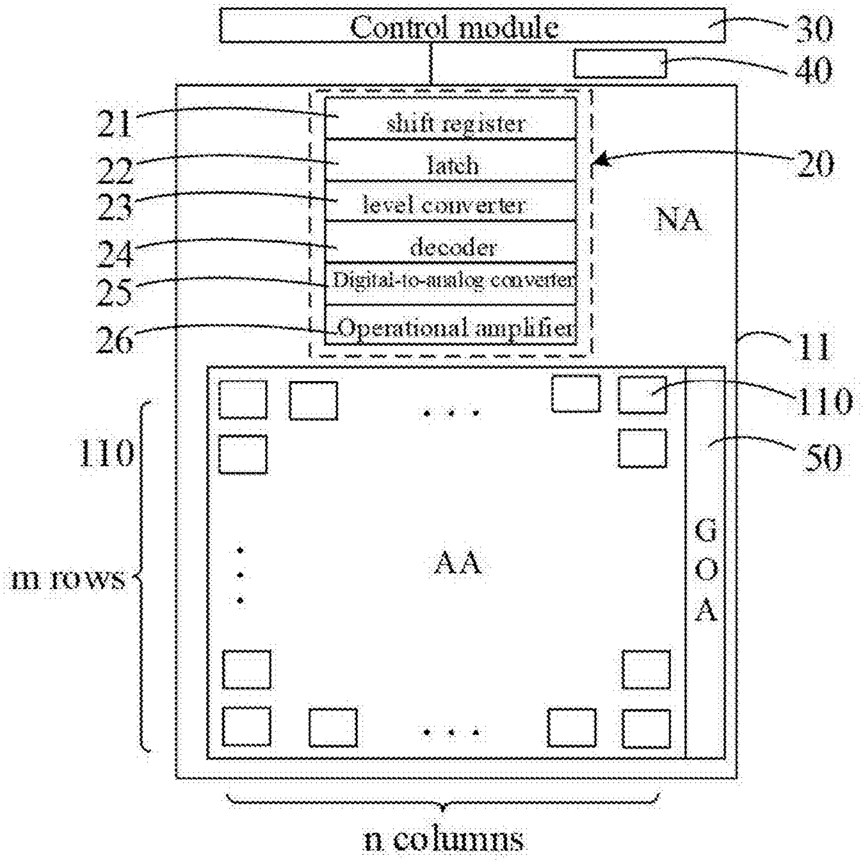
FIG. 2 is a schematic structural diagram of a control module and a display block according to the present disclosure.

Please referring to FIGS. 1 and 2, FIG. 1 is a first schematic structural view of a gate driving circuit according to the present disclosure. FIG. 1 is a schematic structural diagram of a display device according to the present disclosure; and FIG. 2 is a schematic structural diagram of a control module and a display block. An embodiment of the present disclosure provides a display device 100. The display device 100 includes a display panel 10, a plurality of driving modules 20, and a control module 30.

The display panel 10 includes a plurality of display blocks 11. The plurality of driving modules 20 are disposed in one-to-one correspondence with the plurality of display blocks 11. Each of the plurality of driving modules 20 is disposed in corresponding one of the display blocks 11. The control module 30 is connected with the plurality of driving modules 20, respectively. Each of the driving modules 20 is configured to drive the corresponding display block 11 to perform picture display under control of the control module 30. Where frame frequencies of at least two of the display blocks 11 are different from each other.

Where the frame frequency refers to the number of frames or the number of display pictures displayed per second on the display panel 10. For example, the display panel 10 having one frame frequency of 120 Hz displays 120 frames of display pictures per second.

The control module 30 is configured to output a control signal, image data, and the like to the driving module 20. The driving module 20 is configured to process the image data according to the received control signal to drive the display panel 10 to perform picture display.

The embodiments of the present disclosure are based on an unequal-bandwidth data allocation manner of a discrete System On Panel (SOP). One driving module 20 is provided for each of the display blocks 11. Then, the control module 30 can control each of the driving modules 20 to independently adjust and control the frame frequencies of the plurality of display blocks 11, so that the display device 100 can perform display in frame frequencies of display partitions, thereby realizing free collocation and switching of high and low frequencies of different display blocks 11, meeting the requirements of different application scenes, and reducing the power consumption of the display device 100.

In an embodiment of the present disclosure, the display panel 10 may be a high-resolution display screen. The display panel 10 may also be a spliced display screen. Each spliced screen includes at least one display block 11.

In an embodiment of the present disclosure, each display block 11 may include at least one sub-pixel 110. For example, each display block 11 may include a plurality of sub-pixels 110. The plurality of sub-pixels 110 are arranged in m rows and n columns. m and n are both integers greater than or equal to 1. It should be noted that the number of sub-pixels 110 included in each display block 11 may be the same or different, which is not specifically limited in the present disclosure.

In the embodiment of the present disclosure, the control module 30 may include a system chip, a timing controller, or the like to provide image data, a clock signal, a control signal, or the like to the driving modules 20 and the display panel 10. The image data may be RGB display data.

The control module 30 may be bound to a non-display region of the display panel 10. The control module 30 may be bent on aback side of the display panel 10 only, or may be disposed directly on the back side of the display panel 10. Connection lines between the control module 30 and the plurality of driving modules 20 may be disposed in the display panel 10, or may be arranged with the connection lines perforating a backplane of the display panel 10.

The plurality of driving modules 20 are connected to the same control module 30. That is, systematic control of the display panel 10 can be realized by simultaneously controlling the plurality of driving modules 20 with the same control module 30, thereby simplifying timing.

Of course, in some embodiments of the present disclosure, when the size of the display panel 10 is larger and the number of the display blocks 11 is larger, a plurality of control modules 30 may be provided to control respective display blocks 11, respectively.

In an embodiment of the present disclosure, each of the driving modules 20 includes a shift register 21, a latch 22, a level converter 23, a decoder 24, a digital-to-analog converter 25, and an operational amplifier 26 connected sequentially. Each of the display blocks 11 includes a display region AA and one frame region NA connected to the display region AA The driving module 20 corresponding to respective display block 11 is disposed in the display region AA and/or the frame region NA of the respective display block.

For example, the driving module 20 is disposed in the display region AA, so that the width of the frame region NA can be reduced. The driving module 20 is disposed in the frame region NA, so affecting of the picture display of the display region AA can be avoided.

The shift register 21 is connected to the control module 30. The shift register 21 is configured to collect image data output by the control module 30. The level converter 23 is configured to convert a low voltage digital signal in the latch 22 to a medium voltage digital signal of a reference gamma voltage. The decoder 24 is configured to decode the image data provided by the latch 22. The digital-to-analog converter 25 is configured to convert the digital signal processed by the decoder 24 into analog image data. The operational amplifier 26 is configured to enhance driving capability of the analog image data and output the analog image data to a data line in the display region AA.

In some embodiments, the level shifter 23 and/or the decoder 24 may be integrally disposed within the digital-to-analog converter 25, which is not specifically limited in the present disclosure.

In an embodiment of the present disclosure, the display device 100 may further include a power supply chip 40. The power supply chip 40 is configured to provide a power supply voltage required for the normal operation of the display panel 10 and the driving modules 20.

In an embodiment of the present disclosure, the display device may further include a gate driving circuit. The gate driving circuit may be a gate driving chip or a Gate Driver On Array (GOA) circuit. The embodiment of the present disclosure is described by taking the display device 100 including the GOA circuit 50 as an example. The GOA circuit 50 may be disposed in the frame region NA of the display block 11.

In the embodiment of the present disclosure, since the frame frequency of single display block 11 can be independently controlled, the control module 30 can transmit the image data to the driving modules 20 corresponding to different display block 11 at different frame frequencies. In an extreme case, each display block 11 may have an independent frame frequency, and allocation of corresponding image data is performed by the control module 30 and the respective driving module 20.

Figure 3:
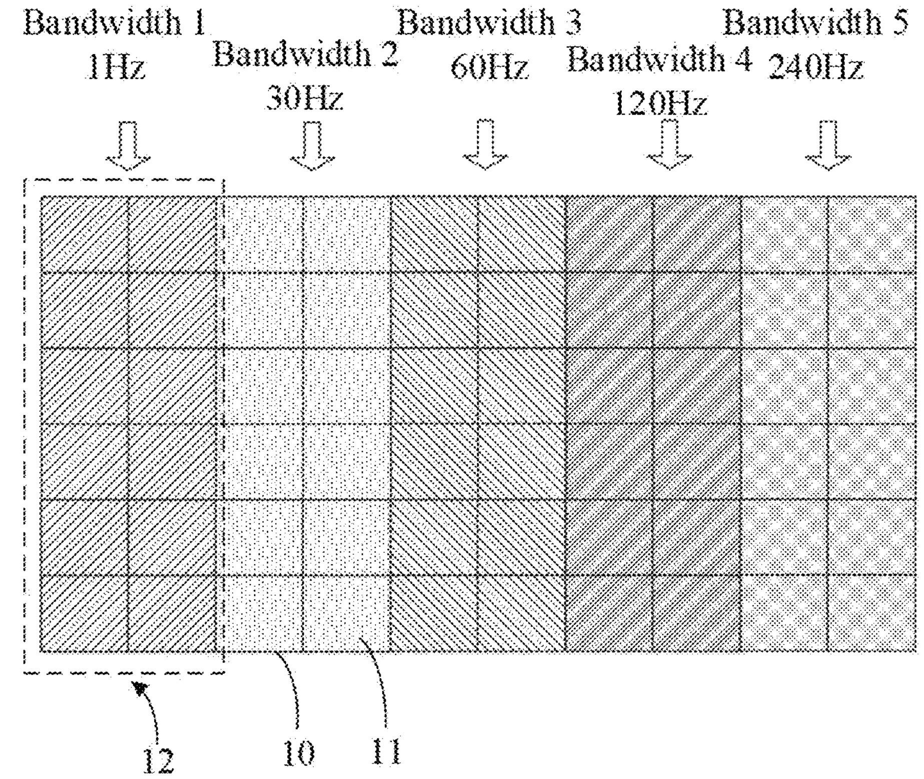
FIG. 3 is a schematic diagram of a first structure of a display panel according to the present disclosure.

Specifically, please refer to FIG. 3, which is a schematic diagram of a first structure of a display panel according to the present disclosure. As shown in FIG. 3, the display panel 10 further includes a plurality of display portions 12. Each of the display portions 12 includes a plurality of display blocks 11. Frame frequencies of the plurality of display blocks 11 located in the same display portion 12 are the same as each other, and frame frequencies of the plurality of display portions 12 are different from each other.

For example, every two adjacent columns of display blocks 11 constitute one display portion 12 by dividing the display blocks 11 in the column direction of the display blocks 11. The number of display blocks 11 in each of the plurality of display portions 12 is the same. In a row direction of the display blocks 11, the frame frequency of the first display portion 12 is 1 Hz, and the image data is transmitted in the bandwidth 1. The frame frequency of the second display portion 12 is 30 Hz, and the image data is transmitted in the bandwidth 2. The frame frequency of the third display portion 12 is 60 Hz, and the image data is transmitted in the bandwidth 3. The frame frequency of the fourth display portion 12 is 120 Hz, and the image data is transmitted in the bandwidth 4. The frame frequency of the first display portion 12 is 240 Hz, and the image data is transmitted in the bandwidth 5.

The bandwidth refers to the amount of data that can be transmitted per unit time, in megabits per second (Mbps). Therefore, the larger the frame frequency of the display portion 12, the larger the transmission rate requirement of the image data, and the larger the bandwidth. It should be noted that the bandwidth 1, the bandwidth 2, the bandwidth 3, the bandwidth 4, and the bandwidth 5 only mean different bandwidths, and a specific bandwidth size may be designed according to actual requirements.

Figure 4:
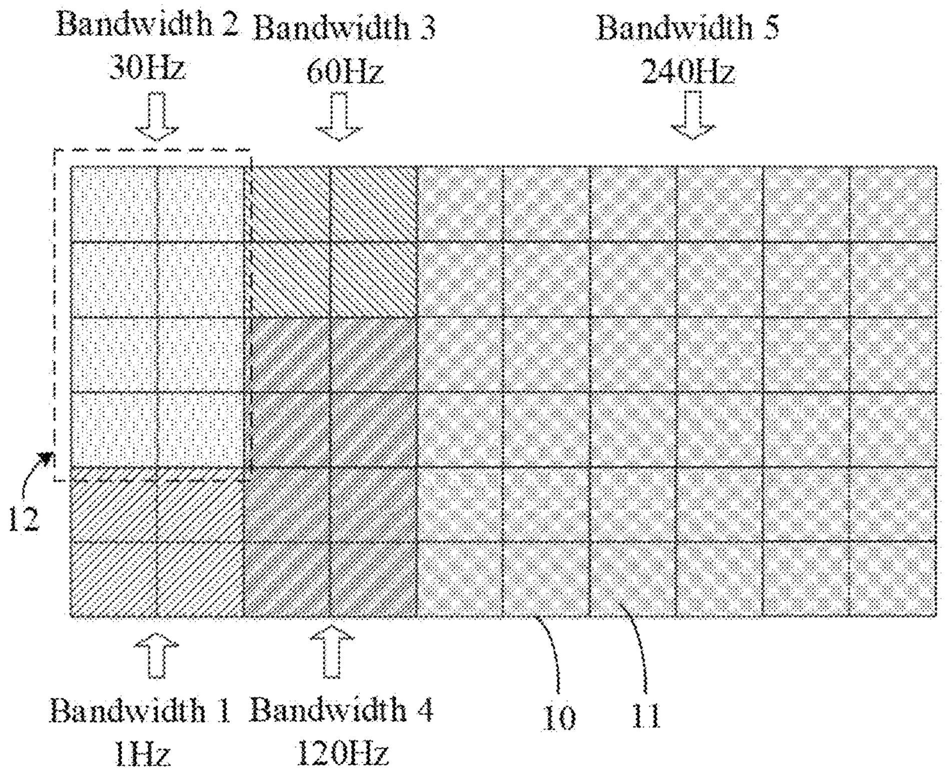
FIG. 4 is a schematic diagram of a second structure of a display panel according to the present disclosure.

For another example, referring to FIG. 4, FIG. 4 is a schematic diagram of a second structure of a display panel according to the present disclosure. The display panel shown in FIG. 4 differs from the display panel 10 shown in FIG. 3 in that a plurality of display blocks 11 may be divided into a plurality of display portions 12 in any manner in the embodiment of the present disclosure. The number of display blocks 11 in each of the plurality of display portions 12 may be different from each other. This division of the display portions 12 makes it possible to adapt to the requirements of more different application scenes.

Of course, in other embodiments of the present disclosure, the display portions 12 may be divided in a row direction. The frame frequency range and the bandwidth to which the display portions 12 can be applied are not limited to the above-described embodiments.

In the embodiment of the present disclosure, application of different frame frequencies of different display blocks 11 can be realized in different ways, while achieving the purpose of saving power consumption. Detailed description is illustrated in following embodiments.

In an embodiment of the present disclosure, the latch 22 may be configured to latch image data corresponding to one frame of display picture.

Where, the latch 22 is equivalent to one frame memory (Frame Memory). When the latch 22 stores the image data corresponding to one frame of display picture, the image data corresponding to the frame of display picture may be stored in the latch 22 for a long enough time, thereby achieving ultra-low frequency display.

In some embodiments, the frame frequency of the display block 11 may be less than or equal to 1 Hz. For example, the frame frequency of the display block 11 may be 1 Hz, 0.8 Hz, 0.5 Hz, 0.2 Hz, or the like.

Figure 5:
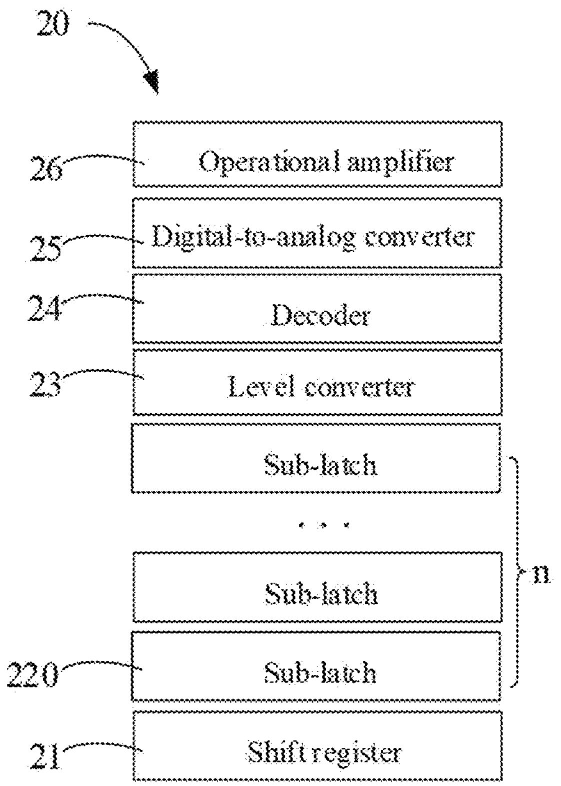
FIG. 5 is a schematic structural diagram of a driving module according to the present disclosure.

Referring to FIGS. 1, 2, and 5, FIG. 5 is a schematic structural diagram of a driving module according to the present disclosure. When the display block 11 includes sub-pixels 110 arranged in m rows and n columns, the latch 22 may include m sequentially connected sub-latches 220. Each of the sub-latches 220 is configured to store image data corresponding to corresponding row of sub-pixels 110.

The embodiment of the present disclosure expands an original latch 22 to m sub-latches 220, which corresponds to the addition of one frame memory to increase a storage function of the latch 22, so that the latch 22 stores the image data corresponding to one frame of display picture once.

Figure 6:
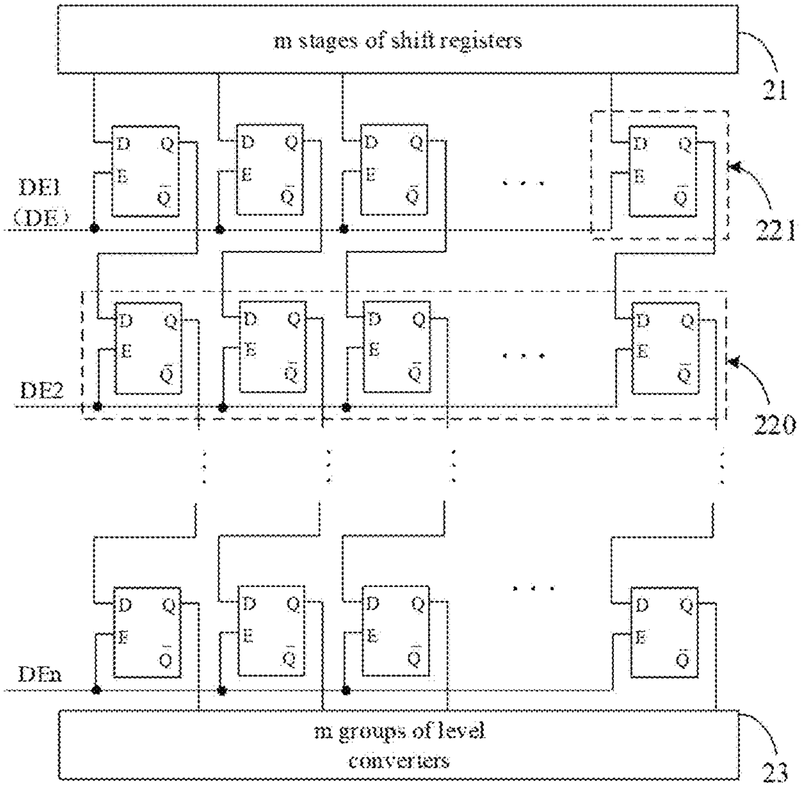
FIG. 6 is a schematic structural diagram of a shift register, a latch, and a level shifter according to the present disclosure.

Specifically, please referring to FIG. 6, which is a schematic structural diagram of a shift register, a latch, and a level converter according to the present disclosure. In the embodiment of the present disclosure, the latch 22 includes a plurality of flip-flops 221. The plurality of flip-flops 221 are arranged in m rows and n columns. Each of the flip-flops 221 includes a trigger terminal E, an input terminal D, and an output terminal Q. n flip-flops E located in the same row constitute one sub-latch 220.

Trigger terminals E of the flip-flops 221 located in the same row are connected to the same trigger signal DE. For example, the trigger terminals E of the flip-flops 221 located in the first row are connected to the first trigger signal DE1. The trigger terminals E of the flip-flops 221 located in the second row are connected to the second trigger signal DE2. The trigger terminals E of the flip-flops 221 located in the third row are connected to the third trigger signal DE3.

In the same column of flip-flops 221, the input terminal D of the flip-flop 221 of the first row is connected to the shift register 21 to receive corresponding image data. The output terminal Q of the flip-flop 221 of the k-th row is connected to the input terminal D of the flip-flop 221 of the (k+1)-th row to sequentially transmit image data corresponding to respective row of sub-pixels 110. The output terminal Q of the flip-flop 221 of the n-th row is connected to the level converter 23. K is an integer greater than or equal to 1 and less than or equal to (m−1).

Where, the driving module 20 includes m stages of shift registers 21 and m groups of level converters 23. The m stages of shift registers 21 are connected in one-to-one correspondence with the input terminals D of the m flip-flops 221 located in the first row. The m groups of level converters 23 are connected in one-to-one correspondence with the output terminals Q of the n flip-flops 221 located in the m-th row.

In the embodiment of the present disclosure, the plurality of flip-flops 221 are provided to constitute the latch 22, and the image data of the frame of display picture can be simultaneously stored in the latch 22 by control of the trigger signal DE and stage transmission relationship of the plurality of flip-flops 221. Of course, the architecture of the expanded latch 22 in the embodiment of the present disclosure is not limited thereto.

Figure 7:
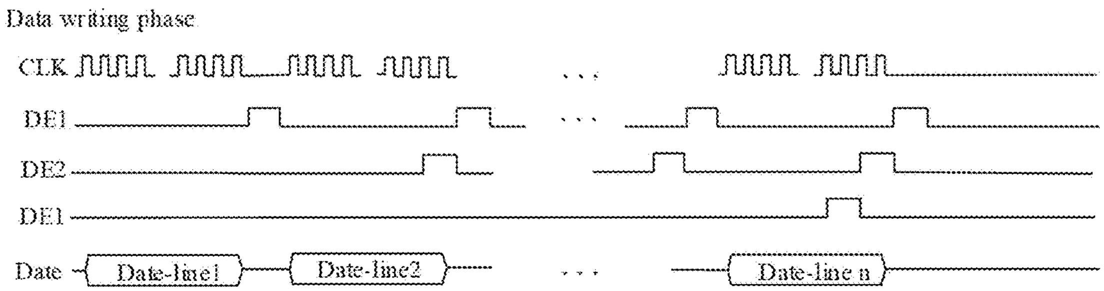
FIG. 7 is a signal timing diagram of a display device in a data writing phase according to the present disclosure.

Specifically, referring to FIGS. 2, 6, and 7, FIG. 7 is a signal timing diagram of a display device at a data writing phase according to the present disclosure. Where, the clock signal CLK, the trigger signal DE, and the image data Date are all output by the control module 30.

In the data writing phase, writing of the image data of the frame of display picture can be accomplished by cooperation of the clock signal CLK, the trigger signal DE, and the image data Date. Specifically, progressive transmission of the image data Date can be completed by sequentially switching on the first trigger signal DE1, the second trigger signal DE2, the (n−1)-th trigger signal DE n−1, and the like, to ensure that the image data Date of each flip-flop 221 is correctly written. Specifically, the first column of flip-flops 221 are used to store display data Date-line1 corresponding to the first column of sub-pixels 110, the second column of flip-flops 221 are used to store display data Date-line2 corresponding to the second column of sub-pixels 110, and the n-th column of flip-flops 221 are used to store display data Date-line n corresponding to the n-th column of sub-pixels 110, which is not described in detail in the present disclosure.

Figure 8:
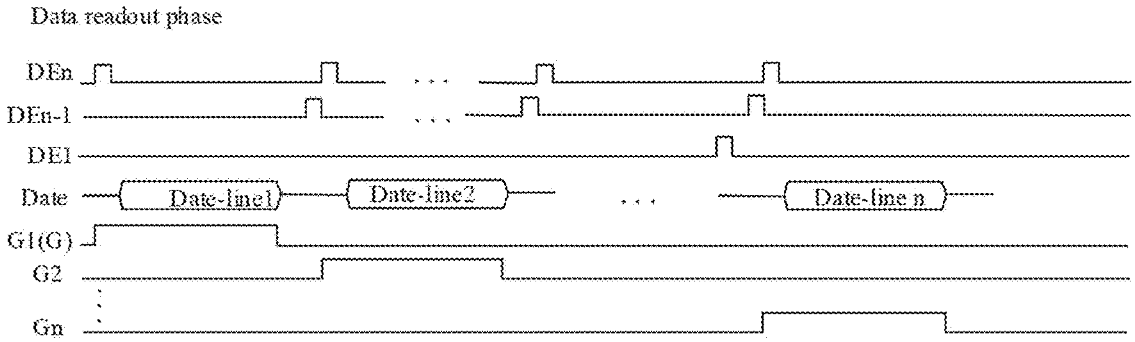
FIG. 8 is a signal timing diagram of a display device in a data readout phase according to the present disclosure.

Please referring to FIG. 8, which is a signal timing diagram of a display device at a data readout phase according to the present disclosure. Where the scan signals G (G1, G2, Gn, etc.) are output by the GOA circuit 50 under the control of the control module 30.

In the data outputting phase, the image data Date corresponding to each row of sub-pixels 110 may be controlled to be sequentially output from the output terminal Q of the flip-flop 221 of the last row by sequentially turning on of the n-th trigger signal DEn, the (n−1)-th trigger signal DE n−1, the first trigger signal DE1, and the like in a time division manner, and sequentially turning on of the first scan signal G1, the second scan signal G2, the n-th scan signal Gn, and the like.

Where, a readout frequency of the latch 22 can be controlled by controlling the frequency of each of the signals, and if the rate at which the image data Date is continuously read out from the latch 22 is sufficiently slow, the display can be realized in the ultra-low frame frequency.

In some embodiments of the present disclosure, a portion of the driving module 20 may be disposed within the display region AA. For example, since the latch 22 includes a plurality of sub-latches 220 connected sequentially. At least one of the sub-latches 220 is disposed in a space between adjacent rows of the sub-pixels 110. Thus, the width of the frame region NA of the display block 11 can be reduced.

In an embodiment of the present disclosure, the latch 22 may be further configured to latch one row of display data in one frame of display picture. As such, the control module 30 can adjust the frame frequencies of the display blocks 11 by controlling pulse frequencies of the clock signal CLK, the image data Date, the scan signal G and the trigger signal DE.

Figure 9:
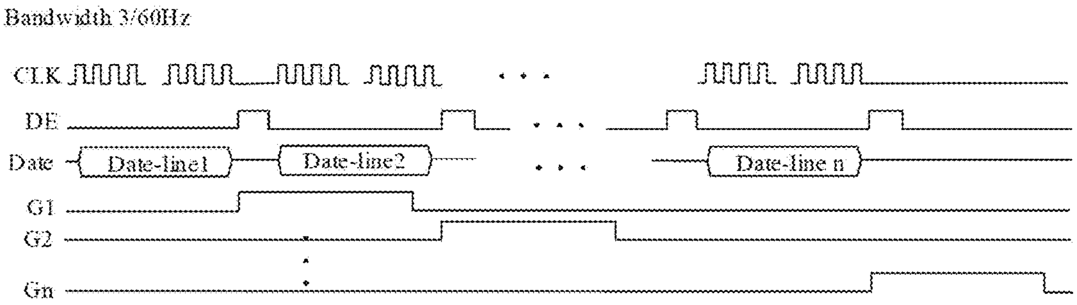
FIG. 9 is a timing diagram of a first signal of a display device according to the present disclosure.

Specifically, referring to FIGS. 2, 6, and 9, FIG. 9 is a timing diagram of a first signal of a display device according to the present disclosure. In the embodiment of the present disclosure, the frame frequency of the display block 11 is 60 Hz, and the image data Date is transmitted in the bandwidth 3.

Specifically, outputting of the image data Date is controlled by cooperation of the clock signal CLK, the trigger signal DE, and the image data Date. Where, writing of the image data Date corresponding to each row of sub-pixels 110 is realized by matching the clock signal CLK with the rate of the image data Date. The image data Date corresponding to each row of sub-pixels 110 is output after being effective for the corresponding trigger signal DE. The first scan signal G1, the second scan signal G2, the n-th scan signal Gn, and the like cooperate with the trigger signal DE to control the display region AA to display.

Figure 10:
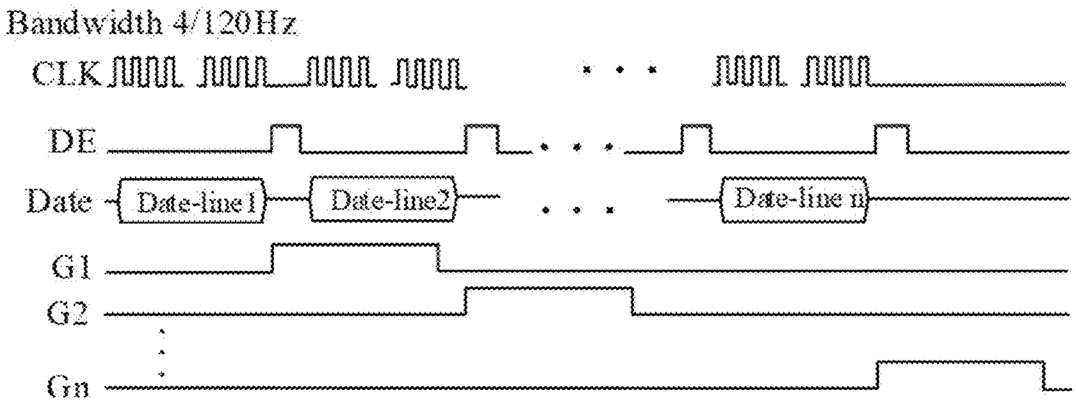
FIG. 10 is a timing diagram of a second signal of a display device according to the present disclosure.
Figure 11:
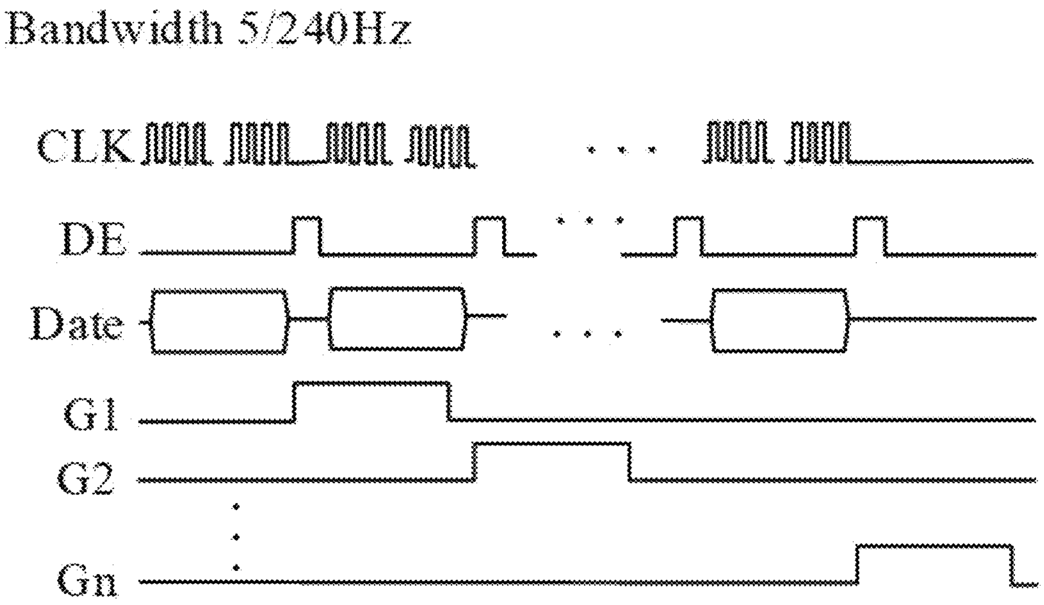
FIG. 11 is a timing diagram of a third signal of a display device according to the present disclosure.

Further, referring to FIGS. 10 and 11, FIG. 10 is a timing diagram of a second signal of a display device according to the present disclosure, and FIG. 11 is a timing diagram of a third signal of a display device according to the present disclosure.

In FIG. 10, the frame frequency of the display portion 11 is 120 Hz, and the image data Date is transmitted in the bandwidth 4. In FIG. 11, the frame frequency of the display portion 11 is 240 Hz, and the image data Date is transmitted in the bandwidth 5. The operation mechanism of the drive timing shown in FIGS. 10 and 11 is the same as the operation mechanism of the driving timing shown in FIG. 9, which is not described in detail in the present disclosure.

It can be seen that, when the latch 22 latches only one row of display data Date in one frame of display picture once, different display blocks 11 may be displayed in different frame frequencies of different display blocks 11 by controlling the pulse frequencies of the clock signal CLK, the image data Date, the scan signal G, and the trigger signal DE of each display block 11. For example, the faster the pulse frequencies of the clock signal CLK, the image data Date, the scan signal G, and the trigger signal DE, the greater the frame frequency of the display block 11.

The embodiments of the present disclosure have been described in detail above. A specific example is used herein to describe a principle and an implementation of the present disclosure. The description of the foregoing embodiments is merely used to help understand a method and a core idea of the present disclosure, and is not therefore intended to limit the scope of the patent of the present disclosure. The equivalent structures or equivalent processes made by the description and drawings of the present disclosure or the description and drawings of the present disclosure utilized directly or indirectly in other related fields of technology should be similarly included within the scope of the present disclosure.

What is claimed is:

1. A display device, comprising:

a display panel comprising a plurality of display blocks;

a plurality of driving modules disposed in one-to-one correspondence with the plurality of display blocks, wherein each of the driving modules is disposed in corresponding one of the display blocks; and a control module connected to the plurality of driving modules, respectively, wherein each of the driving modules is configured to drive the corresponding display block to display under control of the control module;

wherein frame frequencies of at least two of the display blocks are different from each other, and the each of the driving modules comprises a shift register, a latch, a level converter, a decoder, a digital-to-analog converter, and an operational amplifier connected sequentially;

the corresponding display block comprises a display region and one frame region connected to the display region, and the each driving module is disposed in the display region and/or the frame region; and the display panel further comprises a plurality of display portions, wherein each of the display portions comprises a plurality of display blocks, frame frequencies of the plurality of display blocks located in the same display portion are the same as each other, and frame frequencies of the plurality of display portions are different from each other, wherein the display block comprises a plurality of sub-pixels arranged in m rows and n columns, and the latch comprises m sequentially connected sub-latches each for storing image data corresponding to corresponding row of sub-pixels of the m rows of sub-pixels; M is an integer greater than or equal to 2, and n is an integer greater than or equal to 1, and wherein the latch comprises a plurality of flip-flops arranged in m rows and n columns, and each of the flip-flops comprises a trigger terminal, an input terminal, and an output terminal; n flip-flops located in the same row constitute respective one of the sub-latches;

trigger terminals of the flip-flops located in the same row are connected with the same trigger signal; in the same column of flip-flops, an input terminal of the first row of flip-flop is connected to the shift register, an output terminal of the k-th row of flip-flop is connected to an input terminal of the (k+1)-th row of flip-flop, and an output terminal of the n-th row of flip-flop is connected to the level converter; wherein k is an integer greater than or equal to 1 and less than or equal to (m−1).

2. The display device of claim 1, wherein the latch is configured to latch image data corresponding to one frame of display picture.

3. The display device of claim 2, wherein at least one of the sub-latches is disposed in a space between adjacent rows of sub-pixels of the m rows of sub-pixels.

4. The display device of claim 2, wherein the driving module comprises m stages of shift registers connected in one-to-one correspondence with input terminals of m flip-flops located in the first row and m groups of level converters connected in one-to-one correspondence with output terminals of n flip-flops located in the m-th row.

5. The display device of claim 1, wherein each of the frame frequencies of the display blocks is less than or equal to 1 Hz.

6. The display device of claim 1, wherein the latch is configured to latch one row of display data in one frame of display picture.

7. The display device of claim 6, wherein the control module is configured to output a clock signal, the image data, and a trigger signal to the driving modules, and adjust frame frequencies of the display blocks by controlling pulse frequencies of the clock signal, the image data, and the trigger signal.

8. A display device, comprising:

a display panel comprising a plurality of display blocks;

a plurality of driving modules disposed in one-to-one correspondence with the plurality of display blocks, wherein each of the driving modules is disposed in corresponding one of the display blocks; and a control module connected to the plurality of driving modules, respectively, wherein each of the driving modules is configured to drive the corresponding display block to display under control of the control module;

wherein frame frequencies of at least two of the display blocks are different from each other, wherein each of the driving modules comprises a shift register, a latch, and a level converter connected sequentially, wherein the display block comprises a plurality of sub-pixels arranged in m rows and n columns, and the latch comprises m sequentially connected sub-latches each for storing image data corresponding to corresponding row of sub-pixels of the m rows of sub-pixels; M is an integer greater than or equal to 2, and n is an integer greater than or equal to 1, and wherein the latch comprises a plurality of flip-flops arranged in m rows and n columns, and each of the flip-flops comprises a trigger terminal, an input terminal, and an output terminal; n flip-flops located in the same row constitute respective one of the sub-latches;

trigger terminals of the flip-flops located in the same row are connected with the same trigger signal; in the same column of flip-flops, an input terminal of the first row of flip-flop is connected to the shift register, an output terminal of the k-th row of flip-flop is connected to an input terminal of the (k+1)-th row of flip-flop, and an output terminal of the n-th row of flip-flop is connected to the level converter; wherein k is an integer greater than or equal to 1 and less than or equal to (m−1).

9. The display device of claim 8, wherein each of the driving modules comprises a decoder, a digital-to-analog converter, and an operational amplifier connected sequentially; and the corresponding display block comprises a display region and one frame region connected to the display region, and the each driving module is disposed in the display region and/or the frame region.

10. The display device of claim 9, wherein the latch is configured to latch image data corresponding to one frame of display picture.

11. The display device of claim 10, wherein at least one of the sub-latches is disposed in a space between adjacent rows of sub-pixels of the m rows of sub-pixels.

12. The display device of claim 10, wherein the driving module comprises m stages of shift registers connected in one-to-one correspondence with input terminals of m flip-flops located in the first row and m groups of level converters connected in one-to-one correspondence with output terminals of n flip-flops located in the m-th row.

13. The display device of claim 9, wherein each of the frame frequencies of the display blocks is less than or equal to 1 Hz.

14. The display device of claim 9, wherein the latch is configured to latch one row of display data in one frame of display picture.

15. The display device of claim 14, wherein the control module is configured to output a clock signal, the image data, and a trigger signal to the driving modules, and adjust frame frequencies of the display blocks by controlling pulse frequencies of the clock signal, the image data, and the trigger signal.

16. The display device of claim 8, wherein the display panel further comprises a plurality of display portions, each of the display portions comprises a plurality of display blocks, frame frequencies of the plurality of display blocks located in the same display portion are the same as each other, and frame frequencies of the plurality of display portions are different from each other.

* * * * *